United States Patent
Liu et al.

(10) Patent No.: US 6,321,244 B1
(45) Date of Patent: Nov. 20, 2001

(54) STYLE SPECIFICATIONS FOR SYSTEMATICALLY CREATING CARD-BASED HYPERMEDIA MANUALS

(75) Inventors: Peiya Liu, East Brunswick; Liang-Hua Hsu, Robbinsville, both of NJ (US); Sean Daniel Frank Sullivan, Wauwatosa, WI (US); Kenneth Hampel, Yardley, PA (US)

(73) Assignee: Siemens Corporate Research, Inc., Princeton, NJ (US)

( * ) Notice: Subject to any disclaimer, the term of this patent is extended or adjusted under 35 U.S.C. 154(b) by 0 days.

(21) Appl. No.: 08/984,734

(22) Filed: Dec. 4, 1997

(51) Int. Cl.[7] .................................................. G06F 17/30
(52) U.S. Cl. ..................... 707/523; 707/500; 707/501.1; 707/513
(58) Field of Search ..................................... 707/513, 501, 707/500, 517, 523, 906, 900, 501.1; 345/123, 127, 350, 351, 112; 717/1

(56) References Cited

U.S. PATENT DOCUMENTS

| | | | |
|---|---|---|---|
| 5,297,249 | * 3/1994 | Bernstein et al. | 345/356 |
| 5,644,776 | * 7/1997 | DeRose et al. | 707/500 |
| 5,794,257 | * 8/1998 | Liu et al. | 707/501 |
| 5,819,092 | * 10/1998 | Ferguson et al. | 395/701 |
| 5,848,386 | * 12/1998 | Motoyama | 704/5 |
| 5,860,073 | * 1/1999 | Ferrel et al. | 707/522 |
| 5,864,338 | * 1/1999 | Nestor et al. | 345/339 |
| 5,870,552 | * 2/1999 | Dozier et al. | 709/219 |
| 5,907,837 | * 5/1999 | Ferrel et al. | 707/3 |
| 6,006,242 | * 12/1999 | Poole et al. | 707/531 |
| 6,009,436 | * 12/1999 | Motoyama et al. | 707/102 |
| 6,041,331 | * 3/2000 | Weiner et al. | 707/103 |
| 6,061,697 | * 5/2000 | Nakao | 707/513 |

OTHER PUBLICATIONS

Igarashi et al., Adaptive Recognition of Implicit Structures in Human–Organized Layouts, IEEE electronic library, p. 258–266, Sep. 1995.*

* cited by examiner

Primary Examiner—Jean R. Homere
Assistant Examiner—Greta L. Robinson
(74) Attorney, Agent, or Firm—Donald B. Paschburg

(57) ABSTRACT

A system that automatically restructures SGML documents into a format referred to as card-based documents is based on a Card Layout Style Specification Language (CLSSL). The CLSSL controls the information, arrangement, sequencing, and presentation features of the cards. The system includes a scroll-card transformer, a media-card extractor, a card style editor, a platform-independent generator and a platform dependent generator. SGML documents are first transformed in scroll-card transformer into cards based on various scroll-to-card transformation guidelines. The non-textual media that are associated with textual documents are also transformed in the media-card extractor by extracting a portion of the information for individual cards. Once the textual and non-textual documents are transformed properly into cards, the card layout style editor is used to create the formatting commands, referred to as Card Layout Style Specifications (CLSS), for each type of card in the card-based manual. The card-based SGML manual together with a card layout style specification file is then processed by a presentation formatter to generate a platform-dependent format for the presentation tool.

16 Claims, 15 Drawing Sheets

*FIG. 6*

```
<CardManual Type="Plant" Name="Power Plant">
  <Title>...</Title>
  <Card Type="GfxOnly">
    ...
  </Card>
  <CardStack Type="Group" Name="Gas Turbine">
    <Title> ... </Title>
    <CardSeq Type="GfxOnly" Name="Overview of Gas Turbine">
      ...
    </CardSeq>
    <CardStack Type="System" Name="Combustion Chamber">
      <CardStack Type="Assembly" Name="Fuel Oil Burner">
        <CardSeq Type="TextByGfx" Name="Dual-Fuel Burner Assembly">
          <Card Type="TextByGfx">
            ...
          </Card>
          ...
        <CardSeq>
          ...
        <CardStack>
      <CardStack>
      <CardStack Type="System" Name="Lube and Hydraulic Oil System">
        ...
      </CardStack>
      ...
    </CardStack>
    <CardStack Type=:"Group" Name="Generator">
      ...
    </CardStack>
    ...
</CardManual>
```

FIG. 7

```
card presentation <name> {
    card stack <name> {
        <attribute specifications>
        ...
    }
    ...
    card sequence <name> {
        <attribute specifications>
        ...
    }
    ...
    card <name> {
        <attribute specifications>
        ...
    }
    ...
}
```

FIG. 8

```
card presentation "PowerPlantTraining" {
    card stack "GroupStack" {
        type= "Group";
        context= "CardManual";
        ...
    }
    ...
    card stack "SystemStack" {
        type= "System";
        context= "CardManual,CardStack,CardStack";
        ...
    }
    ...
    card stack "AssemblyStack" {
        type= "Assembly";
        context= "CardManual,CardStack,CardStack";
        ...
    }
    ...
    card sequence "TextByGfxSeq" {
        type= "TextByGfx"
        context= "CardStack,CardSeq";
        ...
    }
    ...
    card "TextByGfxCard" {
        type= "TextByGfx";
        context= "CardStack,CardSeq,Card";
        ...
    }
    ...
}
```

*FIG. 9*

```
<Card Type="TextByGfx" ID=N0040199201>
  <Title>Gas Turbine Overview 1</Title>
  <DocHeader Type="Regular"> ... </DocHeader>
  <CardX>
    <AuxCtrl>
      <Audio State="Enabled" FileRef="audio/004002.wav"> </Audio>
      <Animation State="Disabled"> </Animation>
      ...
    <AuxCtrl>
    <CardTitle>
      <Object>Gas Turbine Overview 1</Object>
      <Task>Description</Task>
      <InstrNum>3.1-0040</InstrNum>
    </CardTitle>
    <AnyDocX Start="2">
      <OrderedHead><Title>Gas Turbine Overview</Title></OrderedHead>
      <AnyDocX2>
        <ParaX2>The moving (see<Emphasis>3.1-0610</Emphasis>) and
stationary (See<Emphasis>3.1-0620</Emphasis>) blades inside the compressor (10)
increase .... The moving compressor blades can be removed without removing the
rotor.</ParaX2>
        ...
      </AnyDocX2>
    </AnyDocX>
    <Figure><Title>Figure 2a. VB4.3 Gas Turbine Overview (MB)</Title>
      <Graphic Type="Raster" FileRef=:0040/019902a" Format="GIF">
      </Graphic>
    <Figure>
    </DocCtrl>
        <DistLevel>Technical Publication</DistLevel>
        <DocStatus>Draft</DocStatus>
    </DocCtrl>
  </CardX>
  <DocFooter> ... </DocFooter>
</Card>
```

FIG. 11

```
card <name> {
    <attribute specifications>
    background <name>{
        object <name> {
            <attribute specifications>
        }
        ...
    }
    foreground <name> {
        object <name>{
            <attribute specifications>
        }
        ...
    }
}
```

FIG. 12

```
card "TextByGfxCard" {
    type= "TextByGfx";
    context= "CardStack,CardSeq,Card";
    background "NormalBackground"{
        object "Next" {
            type = "Button"; func = "Forward"; coords = "160 10 200 40";
            context= "current";
        }
        ...
        object "Audio" {
            type = "Button"; func = "Audio"; coords = "260 10 300 40";
            context = "current"; state = "Card.CardX,AuxCtrl,Audio(State)";
            file= "Card,CardX,AuxCtrl,Audio(FileRef";
        }
        ...
        object "TaskList" {
            type = "ComboBox"; func = "TaskList"; coords = "600 10 800 30";
            context = "Current"; content = "Card.CardX.CardTitle,Task"
        }
        ...
    }
    foreground "TextByGfxForeground" {
        object "TitleText" {
            type = "Field"; func = "TitleText"; coords = "10 54 800 94";
            context = "Card.Title"; content = "Title";
        }
        object "TextContent" {
            type = "Field"; func = "TextContent"; coords = "10 94 330 700";
            context = "Card,CardX,AnyDocX"; content = "AnyDocX";
        }
        object "GfxContent" {
            type = "Graphics"; func = "GfxContent"; coords = "360 94 810 700";
            context = "Card,CardX,Figure,Graphic"; content = "Graphic";
            aiu = "Card,CardX,Figure,AIUDoc";
        }
    }
}
```

FIG. 13

```
<CardSeq Type="TextByGfx" Name="Dual-Fuel Burner Assembly">
    <Card Type="TextByGfx" ID=N1350843101>
        <Title>Dual-Fuel Burner Assembly 1</Title>
        ...
        <CardX>
            ...
        </CardX>
        ...
    </Card>
    <Card Type="TextByGfx" ID=N1350843102>
        <Title>Dual-Fuel Burner Assembly 2</Title>
        ...
        <CardX>
            ...
        </CardX>
        ...
    </Card>
    ...
</CardSeq>
```

FIG. 14

```
card sequence <name> {
    <attribute specifications>
    background <name> {
        object <name> {
            <attribute specifications>
        }
        ...
    }
}
card <name> {
    <attribute specifications>
    foreground <name>{
        object <name> {
            <attribute specifications>
        }
        ...
    }
}
```

FIG. 15

```
card sequence "TextByGfxSeq" {
    type= "TextByGfx";
    context= :"CardStack.CardSeq";
    background "NormalBackground"{
        object "Next" {
            type = "Button'; func = "Forward'; coords = "160 10 200 40";
            context = "Current':
        }
        ...
    }
}
card "TextByGfxCard" {
    type= "TextByGfx";
    context= "CardStack.CardSeq.Card";
    foreground "TextByGfxForeground"{
        ...
    }
}
```

FIG. 16

```
card presentation <name> {
    background list {
        background <name>{
            ...
        }
        ...
    }
    foreground list {
        foreground <name> {
            ...
        }
        ...
    }
    -- Styles for card sequences and cards in a card-based manual
    card sequence <name> {
        background <name> {
            style ref = " ... ";
        }
    }
    ...
    card <name> {
        foreground <name> {
            style ref=" ... ";
        }
        ...
    }
    ...
}
```

FIG. 17

```
card presentation "PowerPlantTraining" {
   background list {
      background "NormalBackground"{
         object "Next" {
            type = "Button"; func = "Forward"; coords = "160 10 200 40";
            context = "Current";
         }
         ...
      }
      ...
   }
   foreground list {
      foreground "TextByGfxForeground" {
         object "TitleText" {
            type = "Field'; func = "TitleText"; coords = "10 54 800 94";
            context = "Card.Title"; content = "Title";
         ]
         object "TextContent" {
            type = "Field"; func = "TextContent"; coords = "10 94 330 700";
            context = "Card.CardX.AnyDocX"; content = "AnyDocX";
         }
         ...
      }
   -- Styles for card sequences and cards in a card-based manual
   card sequence <name> {
      background <name> {
         style ref = "NormalBackground";
      }
   }
   card <name> {
      foreground <name> {
         style ref = "TextByGfxForeground";
      }
   }
   ...
}
```

STYLE SPECIFICATIONS FOR SYSTEMATICALLY CREATING CARD-BASED HYPERMEDIA MANUALS

BACKGROUND OF THE INVENTION

1. Field of the Invention

The present invention relates to restructuring documents and more particularly to automatically restructuring SGML documents into card-based documents.

2. Description of the Prior Art

Documentation plays an important role in all stages of a product from design, manufacturing, assembly, to marketing, training, and to operation, maintenance, etc. Technical information is required and shared in all stages of the life-cycle of the product. Due to the advent of various document standards in the recent years, technical documents are being converted, or created from scratch, to conform to the document standards in various industries, e.g., automotive and truck (SAE J2008), semiconductor (PCIS), chemical (CML), air transportation (ATA-100), telecommunication (TCIF/IPI), etc. Different document standards are designed to address the issues at different levels of documentation needs and for different application domains. For example, some standards are meant for representing only the contents of the documents to support structuring of information, while others integrate both the contents and formats to support complex publishing.

Since 1988, a new trend in technical documentation has been emerging to adopt the international standard, SGML (Standard Generalized Markup Language) to define domain-specific document structures, which are then used to represent the content of technical documents. SGML is further described in SGML, ISO 8879:1986 Text and Office Systems—Standard Generalized Markup Language, Geneva, 1986. Documents in SGML separate the content (as much as possible) from the format, so that technical information is preserved, platform-independence is maintained, and can be re-used, e.g., for all products in a product line.

SUMMARY OF THE INVENTION

The present invention is a system that automatically restructures SGML documents into a format referred to as Card-Based Documents. In a given instance, card-based documents present smaller, defined amounts of textual and graphic information than traditional SGML documents and are more suitable for training and marketing purposes and for displaying changes to the state of a machinery over time. The new restructuring system is based on a Card Layout Style Specification Language (CLSSL). The CLSSL controls the information, arrangement, sequencing, and presentation features of the cards. The CLSSL differs from existing presentation tools by offering superior reusability, scalability, inheritance (related to component style information), and author-defined control. In addition, by separating content from presentation, it achieves greater support for multiple presentations on different platforms.

The system for creating card-based hypermedia manuals comprises a scroll-card transformer, a media-card extractor, a card style editor, a platform-independent generator and a platform dependent generator. SGML documents are first transformed in scroll-card transformer into cards based on various scroll-to-card transformation guidelines. The non-textual media that are associated with textual documents are also transformed in the media-card extractor by extracting a portion of the information for individual cards. Once the textual and non-textual documents are transformed properly into cards, the card layout style editor is used to create the formatting commands, referred to as Card Layout Style Specifications (CLSS), for each type of card in the card-based manual. The card-based SGML manual together with a card layout style specification file is then processed by a presentation formatter to generate a platform-dependent format for the presentation tool.

BRIEF DESCRIPTION OF THE DRAWINGS

FIG. 6 illustrates an example of a card-based manual.

FIG. 7 illustrates a card-based presentation style specification.

FIG. 8 illustrates an example of a card-based presentation.

FIG. 9 illustrates an example of a card-based document.

FIG. 11 illustrates a card style specification.

FIG. 12 illustrates an example of a card style.

FIG. 13 illustrates an example of a card sequence.

FIG. 14 illustrates a card sequence style.

FIG. 15 illustrates an example of a card sequence style.

FIG. 16 illustrates common resource specifications.

FIG. 17 illustrates an example of defining/referencing common resources.

DETAILED DESCRIPTION OF THE INVENTION

Figure 1:
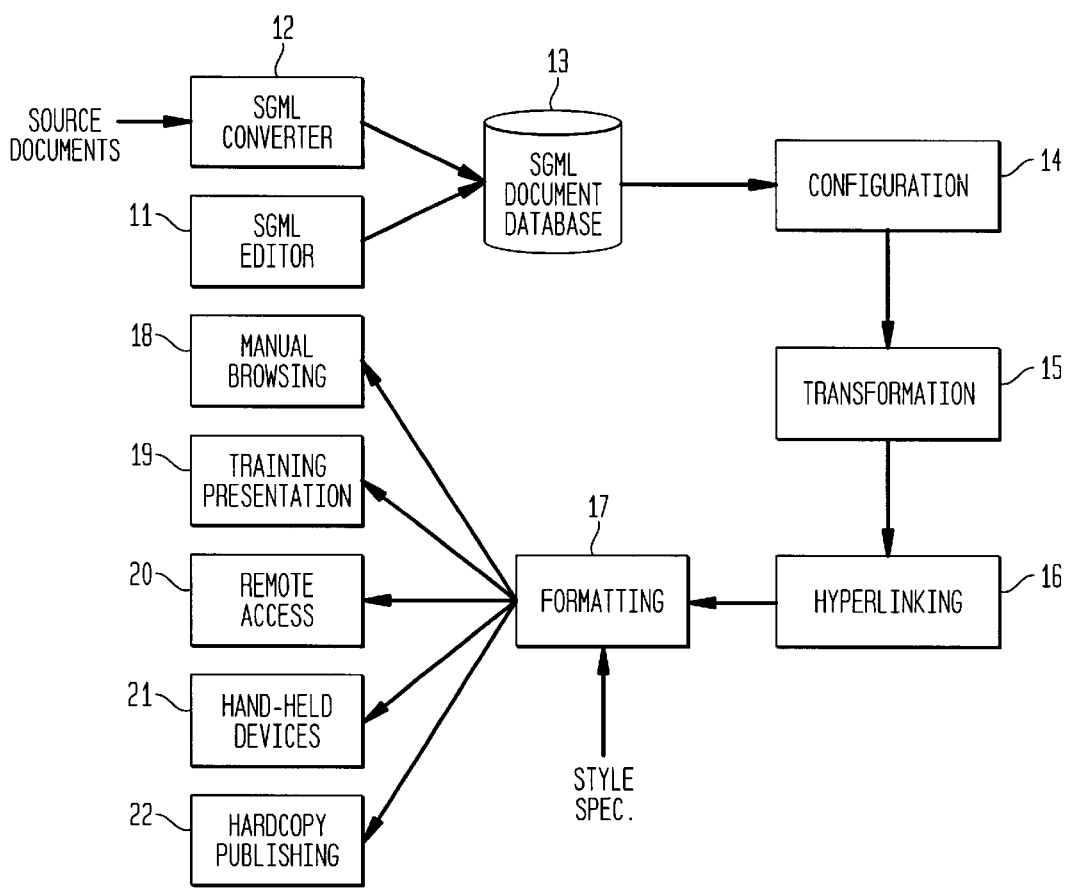
FIG. 1 illustrates SGML for multiple presentations.

Once technical information is stored in an SGML structure, it can be manipulated, restructured, and formatted for many different purposes through the entire life-cycle of the product. This is illustrated in FIG. 1. SGML documents are either created from scratch with SGML editors 11 or converted by an SGML converter 12 from source documents that are created with a word processor. SGML documents for various common product components are collected and stored in an SGML document database 13. From the implementation point of view, an SGML document database 13 can be a file structure or a commercial database or a sophisticated document management system.

Based on the model of a product and the purpose of the documentation, a configuration process 14 is performed to select proper versions of the SGML documents from the document database 13 and organize them to create a technical manual. A technical manual can then be transformed 15, hyperlinked 16, and formatted 17 for various presentation purposes, e.g., on-line manual browsing 18, training presentation 19, remote access (through wired or wireless network) 20, carrying out inspection procedure and collecting field data with hand-held devices 21, and of course, for publishing on paper 22. Formatting 17 receives a style specification as an input.

The present invention is a system that automatically restructures SGML documents into a format referred to as Card-Based Documents. The concept of "card" was first introduced by F. G. Halasz in Halasz, F. G., "Seven Issues Revisited", Keynote Talk at ACM Hypertext '91, San Antonio, Tex., 1991. In a given instance, card-based documents present smaller, defined amounts of textual and graphic information than traditional SGML documents. Preliminary user evaluations suggests that card-based hypermedia manuals are more suitable for training and marketing purposes and for displaying changes to the state of a machinery over time. The restructuring method is based on a Card Layout Style Specification Language (CLSSL). The CLSSL controls the information, arrangement, sequencing, and presentation features of the cards. The CLSSL differs from existing presentation tools such as Toolbook, Director, HTML, and Powerpoint by offering superior reusability, scalability, inheritance (related to component style information) and author-defined control. In addition, by separating content from presentation, it achieves greater support for multiple presentations on different platforms.

The following will describe a Card-Based Hypermedia Presentation. Documents are typically organized for browsing purposes. The contents are divided into chapters, sections, subsections, paragraphs, etc., based on some logical structures. Although some guidelines for technical writing and publishing usually apply, each document, e.g., a section or subsection, can be as long as necessary, the contents are arranged sequentially, and text, tables, and graphics are intermixed in a way that facilitates sequential reading.

On the other hand, training presentations are typically organized as slide shows and information on each slide is organized in a way that can be easily observed. In addition, each slide contains only enough textual and graphic information for the audience to assimilate in a small amount of time (e.g., a few minutes). Throughout this specification, presentation slides are referred to as cards, and the SGML documents that are to be rendered as presentation slides are referred to as Card-Based Documents (CBD), also, when the context is clear, "card" is used in place of "card-based document" to be more concise.

Figure 2:
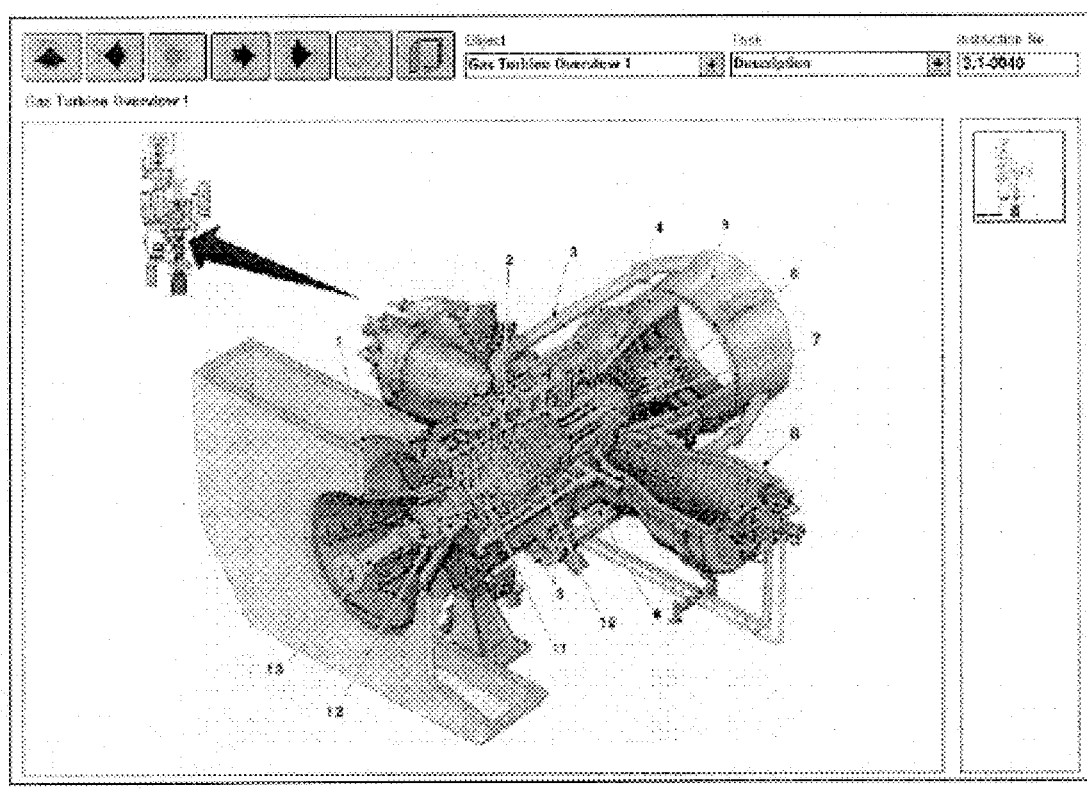
FIG. 2 illustrates an example of a graphics-only card.

An example of a graphics-only card is shown in FIG. 2. This card contains a single graphic that indicates the major components of a gas turbine, which is displayed in the "foreground". There are browsing control buttons, data fields, and icons displayed in the "background", which is only visible in the area surrounding the main graphic. Audio can be activated from the audio button to provide a description for the graphic.

Hyperlinking is automatically performed on the AIUs (Anchorable Information Units) of the graphics, so the call-outs on the graphics can be linked to photo images, schematic diagrams, CAD drawings, database, etc. In addition, hyperlinking can also be performed on the AIUs of audio, so that the audio may trigger a blinking effect on the call-outs on the graphics.

Figure 3:
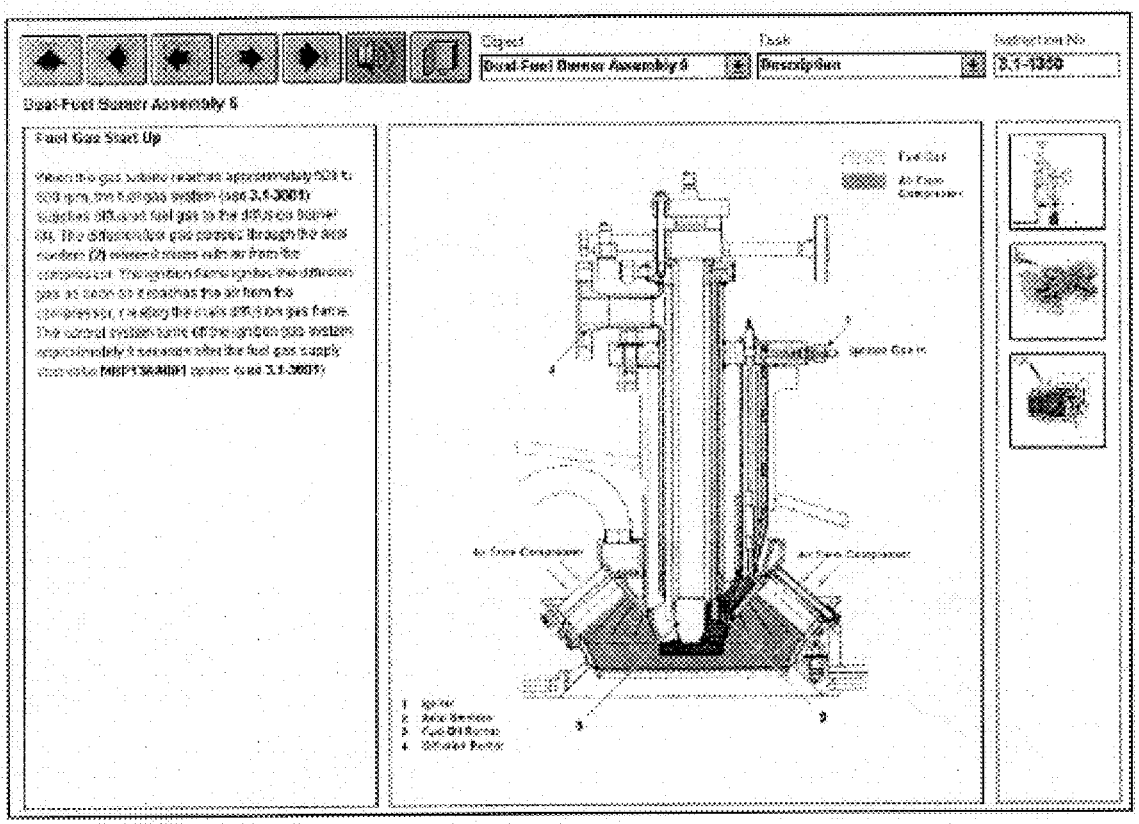
FIG. 3 illustrates an example of a text-by-graphics card.

An example of a text-by-graphics card is shown in FIG. 3. This card contains an area of text and an area of graphics. In addition to the textual description, audio that is either pre-recorded or automatically synthesized from the text may be activated through the audio button. The list of icons next to the graphics in the "background" keeps track of the levels of the card-based manual (i.e., the hierarchy of the gas turbine) to provide navigational support.

As stated above, SGML documents are generally created for storing and preserving technical information. Due to the requirements in the structures and contents of the documents in a training presentation, the SGML documents in the document database need to be manipulated and restructured before being presented to the audience. Although it is possible to create card-based documents directly, the reusability of the technical information is limited. Since SGML documents are of arbitrary sizes, an SGML browser always provides scroll-bars for scrolling the documents vertically (and horizontally). Thus, SGML documents are also referred to as Scroll-Based Documents (SBD). On the other hand, card-based documents are of a fixed size, and its contents are arranged in a two-dimensional area. Although the viewers for presenting cards also provide scroll-bars, the use of scroll-bars is usually not recommended.

Figure 4:
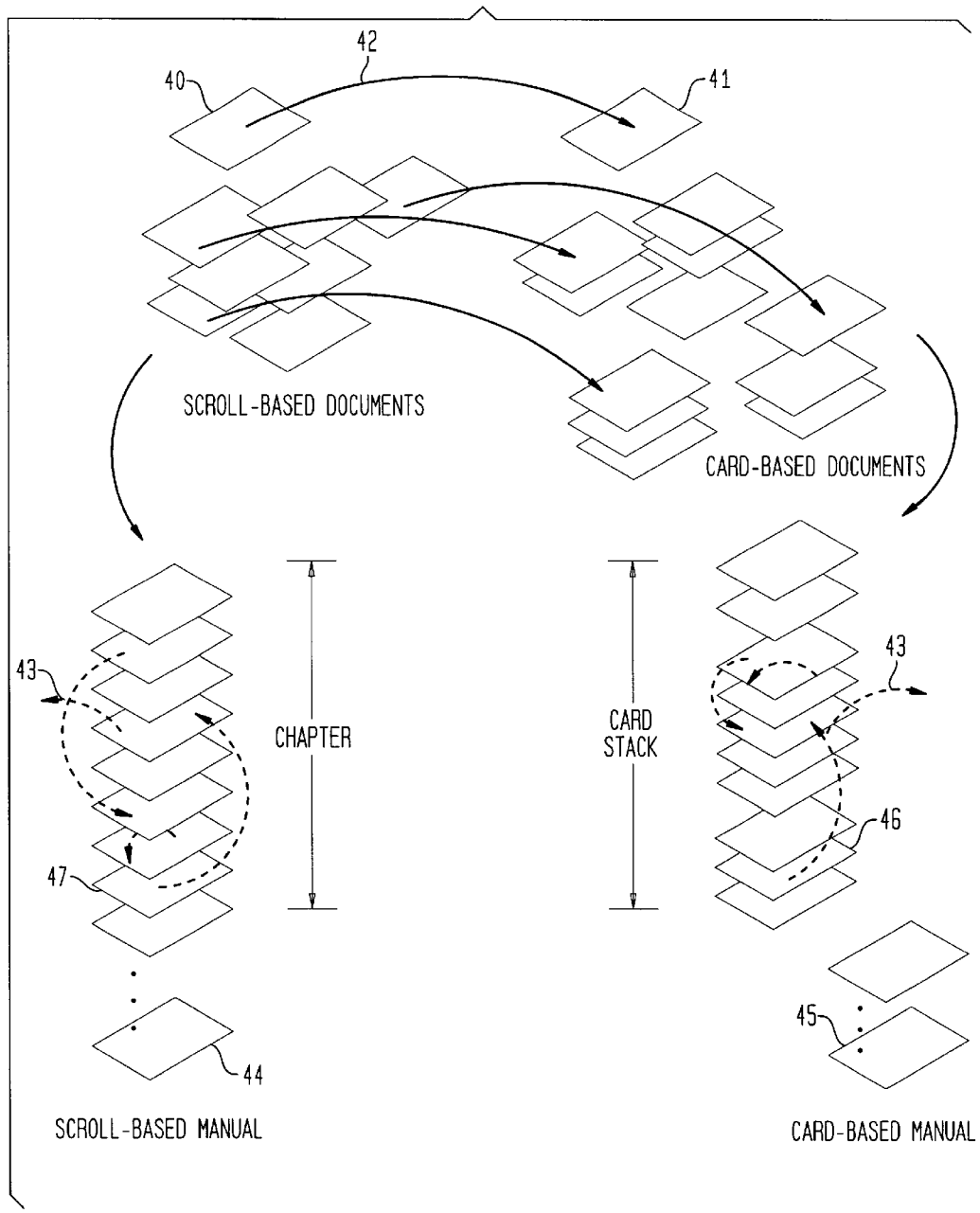
FIG. 4 illustrates scroll-based documents vs. card-based documents.

The relationship between scroll-based documents 40 and card-based documents 41 is shown in FIG. 4, in which boxes of different sizes represent scroll-based documents 40 while boxes of a fixed size are cards 41. Solid lines with arrows 42 from scroll-based documents 40 to cards 41 suggest possible transformations and dotted lines with arrows 43 in a scroll-based manual 44 or a card-based manual 45 represent possible types of hyperlinks. With the present invention, the content of a card-based manual 45 is organized as card stacks 46, card sequences, and cards. A scroll-based document 44 with a small amount of content may be mapped to a single card while a scroll-based document with a lot of content, a chapter 47, would be mapped to many cards so that a small amount of information is presented on each card.

Figure 5:
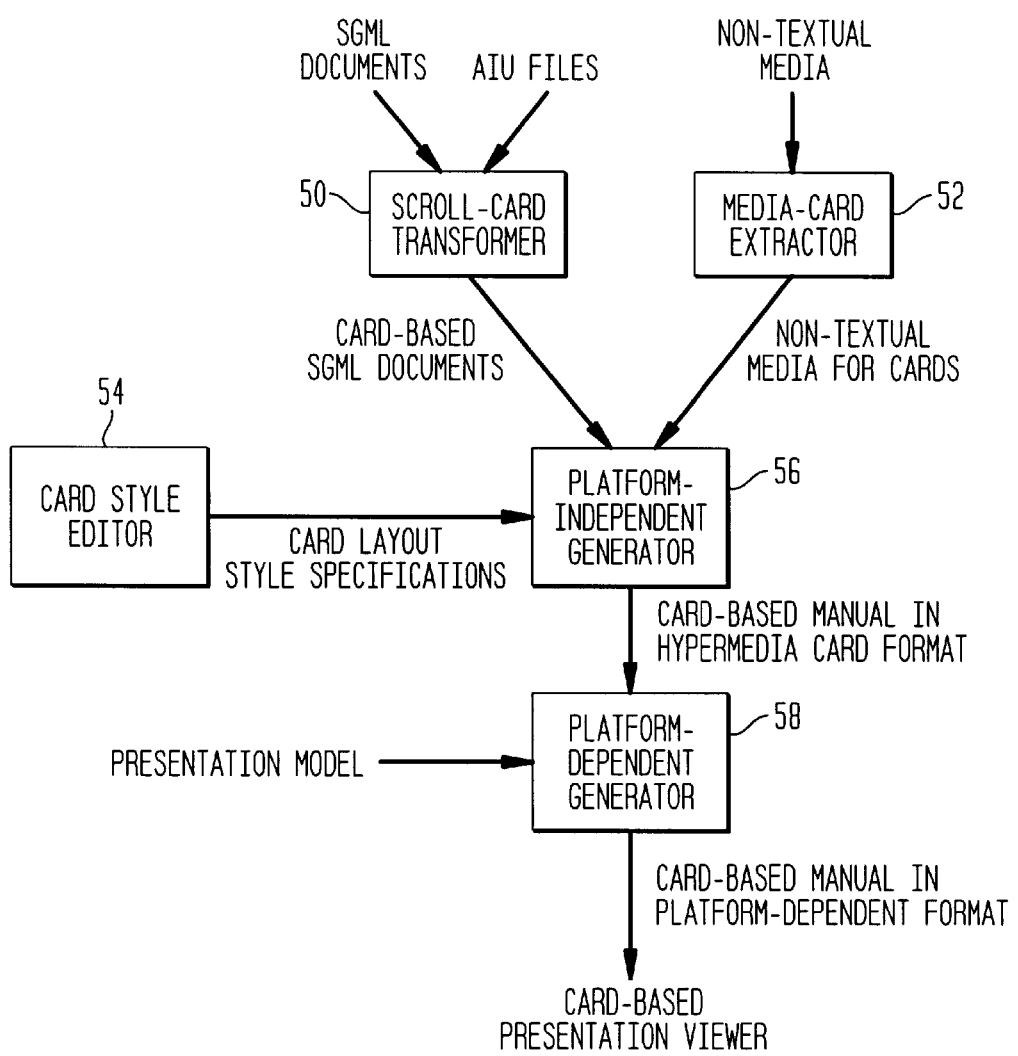
FIG. 5 illustrates a block diagram of the present invention.

As shown in FIG. 5, a block diagram of the present invention, the system for creating card-based hypermedia manuals comprises the following. SGML documents are first transformed into cards based on various scroll-to-card transformation guidelines. This is performed in scroll-card transformer 50. As an example, a simple guideline can be breaking the documents at the second-level heading, i.e., each card contains the contents from a second-level heading and all paragraphs that follow (until the next second-level heading). The non-textual media that are associated with textual documents are also transformed by extracting a portion of the information for individual cards. This is performed in media-card extractor 52. AIUs extracted from non-textual media can also be represented in SGML and are also transformed in a similar way as textual documents.

Once the textual and non-textual documents are transformed properly into cards, a Card Layout Style Editor 54 is used to create the formatting commands, referred to as Card Layout Style Specifications (CLSS), for each type of card in the card-based manual. The card-based SGML manual together with a card layout style specification file is then processed by a presentation formatter to generate a platform-dependent format for the presentation tool, e.g., OpenScript for Toolbook. Toolbook is described in "Toolbook II—Instructor", Version 5.01, Asymetrix Corporation, 1996. Card-based SGML documents, non-textual media for cards and card layout style specifications are an input to platform-independent generator 56 which provides a card-based manual in hypermedia card format. Platform-dependent generator 58 then takes the card-based manual in hypermedia card format and a presentation model input and provides a card-based manual in platform-dependent format.

The following will describe Card-Based Presentation Style Specifications. As stated above, a card-based manual consists of a set of card stacks. Each card stack is roughly equivalent to a volume or chapter in a scroll-based manual. Card stacks are used as a mechanism for structuring a card-based manual and they form the high-level structure of a card-based manual. In particular, card stacks for technical manuals can be nested in as many levels as necessary to represent the hierarchical structure of a complex product. A card stack consists of a list of card sequences. A card sequence is roughly equivalent to a section or subsection in a scroll-based manual. A card sequence consists of a list of cards and each card is a basic document in a card-based manual. Cards can be located directly in a card stack to represent documents that do not belong to any card sequences.

An example of a card-based manual in SGML is shown in FIG. 6. Refer to SGML, ISO 8879:1986 Text and Office Systems—Standard Generalized Markup Language, Geneva, 1986, for the SGML syntax. The card-based power plant manual is divided into three nested card stacks: Group, System, and Assembly. Each card stack has some card sequences and cards to provide overviews and some general information for the top plant level as well as lower-level card stacks to provide more detailed information for the lower-level structures.

A card layout style is a set of formatting commands that can be applied to document components in a card-based manual. When a card layout style is applied to similar document components, those components will have the same look-and-feel during a presentation. A card-based presentation style consists of a list of layout style specifications for card stacks, card sequences, and cards in a card-based manual. In this specification, a Card Layout Style Specification Language (CLSSL) is presented for specifying card layout styles. A Card Layout Style Editor is usually used to graphically specify the arrangement of the layout and make references to the information in the card-based manual.

The CLSSL differs from the style mechanisms in other hypermedia presentation tools such as Toolbook, Director, HTML, and Powerpoint in: (1) reusability—reusing the same style information across several documents or different parts of documents, (2) scalability—adding styles to a large amount of documents automatically without major effort, (3) inheritance—sharing the style information across the structure levels of the documents, (4) author-definable—creating authors'own layout styles and presentation controls, (5) platform-independence —supporting the presentation of the same document content on different presentation platforms.

The syntax of a card-based presentation style specification is shown in FIG. 7. An example of a card-based presentation style specification is shown in FIG. 8. It contains style specifications for the three types of card stacks in a card-based gas turbine manual and style specifications for some card sequences and cards. Each style specification begins with a list of attribute specifications to identify the types of card stacks, card sequences, or cards to which the styles apply. More details on layout styles are presented below.

The "context" attribute adds additional constraints to the relationship between a style specification and the components in the documents by identifying a specific context in which the specified type of document component applies. A context specification consists of a list of SGML object names (i.e., SGML tags) and may also indicate the attributes of the objects to further qualify the type of the objects in the context.

The following will describe Card Layout Style Specifications. A card-based document consists of a structure of information objects which are to be rendered in a two-dimensional area during presentation. An information object may contain textual information (e.g., one or more paragraphs, a list of items, etc.) or non-textual information (e.g., a schematic diagram, a photo image, etc.). In its SGML form, a card-based document is no different from any other SGML documents, except that it is structured in such a way to facilitate the rendering of its content in a two-dimensional area and the content of an object is limited to an amount that can be rendered in a pre-defined, fixed-sized area.

Depending on the specific training applications and the instructor's preferences, a card-based document may contain as many text and non-textual objects as needed and can be arranged in many different ways. If card-based documents are generated from scroll-based documents, the SGML-to-SGML transformation can be performed based on the instructor's requirements. Typical card-based documents are: graphics-only cards with audio for explanation, text-by-graphics cards with text and graphics displayed side-by-side, etc. Refer to FIGS. 2 and 3 for layout examples. In addition to the main content of a card, other supporting information such as header, footer, titles, and auxiliary control for audio, video, and animation, are also required during presentation.

An example of a card-based document is shown in FIG. 9. It is an SGML document that contains two main objects: a text object <AnyDocX> and a graphics object <Figure>. This document is identified as a TextByGfx card, since it is meant for the text area and the graphics area to be rendered side-by-side in the center of the card during presentation. It also contains supporting information such as <Title>, <DocHeader>, <CardTitle>, <AuxCtrl>, <DocCtrl>, and <DocFooter>.

A card layout is actually a 2½-D display space. That is, a layout can be divided into as many sub-spaces in the Z-axis as the structural levels in a card-based manual. For example, if there are three nested card stacks, each contains sequences of cards, then it is possible to divide the card layout into five sub-spaces; three of them for the three card stacks, one for card sequences, and one for cards themselves. Typically, presentation features specified in card stacks remain on the display when rendering the lower-level card stacks, card sequences, and cards. Similar inheritance properties apply between card sequences and cards.

To simplify the discussion throughout this specification, the card layout is divided into only two sub-spaces that are referred to as the background and foreground of the layout. The objects in the background usually remain stable across a sequence of cards, while the objects in the foreground change from card to card. The objects in the background and foreground of a card may overlap or may be separate in different areas of the layout. Similarly, the objects in the background or foreground may also overlap or may be separate. However, typically, background and foreground are assigned to different areas of the display and objects in the background or foreground are also separate.

Figure 10:
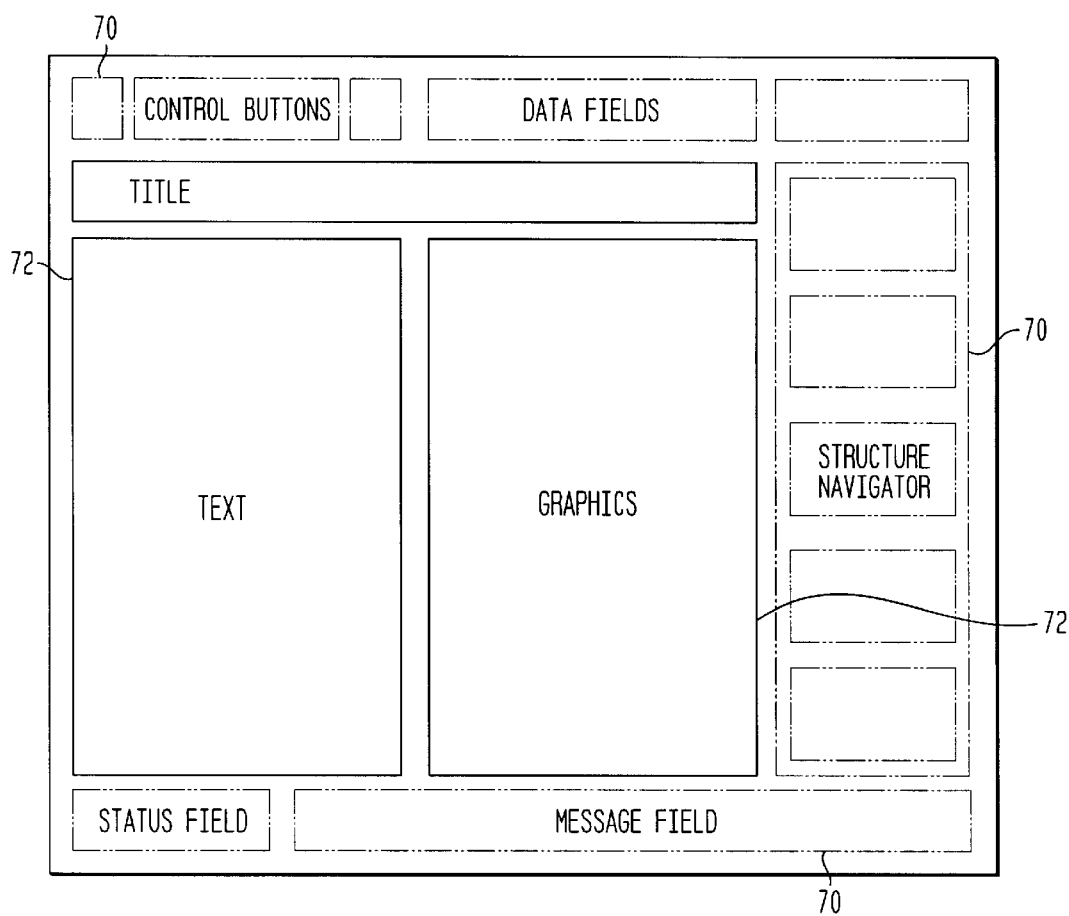
FIG. 10 illustrates an example of a card layout.

An example of a card layout is shown in FIG. 10. The dotted boxes 70 refer to objects in the background while the solid boxes 72 refer to objects in the foreground. In this example, the main contents of the card are displayed in the foreground so that they can be changed in every card while the auxiliary controls are displayed in the background. Although the general properties of the objects in the background are not changed, some limited customizing can take place when switching from card to card, e.g., audio, video, and animation control buttons can be enabled (with normal colors) or disabled (with gray colors), data fields can be filled with information extracted from the card-based document, etc.

With the present invention, the concept of structure navigation control is also supported. That is, in addition to the journal mechanism that is provided by most presentation tools, a Structure Navigator can be specified as an additional control on the background of a card layout. The Structure Navigator will cause the presentation tool to keep track of the structure levels that the user has traversed in the card-based manual. It allows the user to easily jump back to any previous structure level and review any cards that have been viewed during a presentation session. Since the number of structure levels in a card-based manual is often very small compared to the journal mechanism, the structure navigation control can be implemented more efficiently and used more effectively.

In addition to the Structure Navigator, other presentation controls can also be added to the background of a card layout, e.g., browsing control buttons for moving back and forth between cards in a card sequence, status field for indicating the distribution status of the information displayed on a card, message field for communicating with the user, etc.

A card layout style specification is a list of presentation objects for rendering the contents of the information objects in card-based documents and for controlling the presentation. The syntax for a card layout style specification is shown in FIG. 11. It consists of a list of attribute specifications for identifying the type of card that a presentation style applies and a list of background objects and a list of foreground objects for presentation. Each presentation object consists of a list of attributes to control the presentation of the information referred to by the object.

An example of a card style specification is shown in FIG. 12. Most presentation objects refer to the information objects in the card-based document shown in FIG. 9 and additional presentation objects are added for presentation control purposes.

The "content" attribute makes reference to the content of the object (in the specified context) in the SGML document, i.e., the content of a presentation object is extracted from the SGML document object and if the formatting information for the SGML document object is available, it will be extracted for the presentation object as well. The structure navigation control is specified by identifying the context in which the structure level (e.g., PlantLevel) will be recorded and the content from which the icon will be extracted (e.g., by scaling down the graphics on the Overview card of the PlantLevel).

The following will describe Card Sequence Style Specifications. Due to the limited amount of information that can be presented on a card (without using scroll-bars), cards are usually grouped together to form a card sequence that presents a specific subject. Consequently, all cards in a card sequence share the same background and have a similar layout for foreground. In order to achieve such a presentation effect, a card-based manual also contains card sequences for grouping information objects. An example of a card sequence in a card-based manual is shown in FIG. 13. It is a card sequence for describing a dual-fuel burner assembly and consists of two or more cards to describe the steps of operation of the dual-fuel burner assembly.

In general, a card sequence is a mechanism for grouping presentation styles, i.e., it contains presentation objects that are to be repeated in (the background and/or foreground of) all cards in the same sequence. With the present invention, presentation objects that remain more or less stable are located in the background and objects that change from card to card are in the foreground. Thus, the style specification for a card sequence contains only background objects. The syntax for a card sequence style specification is shown in FIG. 14. Cards can be used independently in a card-based manual or can be part of a card sequence. In the former case, a card may contain both background and foreground, while in the latter case, a card will specify only its foreground, sharing the same background with other cards in the same card sequence.

An example of a card sequence style is shown in FIG. 15 which is a rewrite of the specification in FIG. 12. With this specification, the presentation mechanism will render the background objects when presenting a card sequence from a card-based manual. It will then render the foreground objects for each card in the card sequence, keeping the same background on the display.

The following will describe the Specification of Common Resources. To make style specifications more concise, common backgrounds and foregrounds can be optionally collected in the background list and foreground list, respectively. Once backgrounds and foregrounds are defined, they can be referenced in the style specifications for card sequences and cards. The syntax for the background and foreground lists is shown in FIG. 16. In addition, other resources such as various options and parameters applied to the card-based presentation, icons and bitmaps for various controls in the background, etc., can also be defined and collected in the lists at the beginning of the style specification.

An example of defining and referencing a common background and foreground is shown in FIG. 17 which is a rewrite of the specification in FIG. 15.

As stated above, the present invention is a new system for specifying card layout styles which separates the content of the card-based SGML documents from a presentation and makes it possible to re-use the SGML documents for a training presentation. The present invention includes the following aspects: 1. The concept of Card-Based Documents and Card-Based Manuals is introduced for representing the contents of training documents which can be transformed automatically from Scroll-Based Documents and Scroll-Based Manuals with SGML-to-SGML transformation tools. 2. A card-based manual consists of card stacks, card sequences, and cards. Card stacks can be nested to represent the hierarchical structure of a complex product and card sequences is a mechanism for grouping cards that share common presentation features. 3. Card layout styles are presented to separate the contents of training documents from presentation. A card layout is a 2½-D display space and is divided into as many sub-spaces as the structural levels in a card-based manual. 4. A Card Layout Style Specification Language is designed to represent card layout styles and re-use the contents from card-based SGML documents for the training purpose. 5. A card sequence style specification consists of a list of presentation objects for the background of a card layout while a card style specification consists of a list of presentation objects for the foreground. 6. The type attribute is used to establish the connection between a presentation object and an SGML document object. The context attribute is used to identify a specific context in which the specified type of object is located. The content attribute makes reference to the content of the SGML document object. 7. The Structure Navigator is designed to provide navigational support by keeping track of the structure levels that the user has traversed in the card-based manual. It allows the user to easily jump back to any previous structure level and review any cards that have been viewed during a presentation session.

It is not intended that this invention be limited to the hardware or software arrangement or operational procedures shown disclosed. This invention includes all of the alterations and variations thereto as encompassed within the scope of the claims as follows.

What is claimed is:

1. A style specifications system for systematically creating card-based hypermedia manuals comprising:

a scroll-card transformer for receiving SGML documents and having scroll-to-card transformation guidelines for transforming said SGML documents into card-based SGML documents;

a platform independent generator connected to said scroll-card transformer;

a card style editor connected to said platform independent generator, wherein the card style editor comprises a generator for generating card layout style specifications for formatting card-based SGML documents; and a platform dependent generator connected to said platform independent generator for providing said card-based hypermedia manuals in platform-dependent format.

2. A style specifications system for systematically creating card-based hypermedia manuals as claimed in claim 1 further comprising:

a media-card extractor connected to said platform independent generator for receiving non-textual media.

3. A style specifications system for systematically creating card-based hypermedia manuals as claimed in claim 2 wherein said media-card extractor comprises:

extraction means for extracting a portion of information for individual cards.

4. A style specifications system for systematically creating card-based hypermedia manuals as claimed in claim 3 wherein said media-card extractor further comprises:

AIU extraction means wherein non-textual AIUs extracted from said non-textual media are represented in SGML and transformed as textual documents.

5. A style specifications system for systematically creating card-based hypermedia manuals as claimed in claim 1 wherein said platform independent generator comprises:

receiving means for receiving card-based SGML documents and card layout style specifications; and processing means for providing a card-based manual in hypermedia card format.

6. A style specifications system for systematically creating card-based hypermedia manuals as claimed in claim 1 wherein said platform dependent generator comprises:

receiving means for receiving said card-based manual in hypermedia card format; and processing means for providing a card-based manual in platform-dependent format.

7. Style specifications for systematically creating card-based hypermedia manuals comprising:

a scroll-card transformer for receiving SGML documents and AIU files;

a presentation fonnatter connected to said scroll-card transformer; and a card style editor connected to said presentation fonnatter, wherein the card style editor comprises a generator for generating card layout style specifications for formatting card-based SGML documents.

8. A Style specifications system for systematically creating card-based hypermedia manuals as claimed in claim 7 further comprising:

a media-card extractor connected to said presentation formatter for receiving non-textual media.

9. A Style specifications system for systematically creating card-based hypermedia manuals as claimed in claim 7 wherein said scroll-card transformer comprises:

scroll-to-card transformation guidelines for transforming said SGML documents into card-based SGML documents.

10. A Style specifications system for systematically creating card-based hypermedia manuals as claimed in claim 7 wherein said presentation formatter comprises:

a platform-independent generator connected to said scroll-card transformer and said card style editor; and a platform-dependent generator connected to said platform independent generator.

11. A Style specifications system for systematically creating card-based hypermedia manuals as claimed in claim 10 wherein said platform independent generator comprises:

receiving means for receiving card-based SGML documents and card layout style specifications; and processing means for providing a card-based manual in hypermedia card format.

12. A Style specifications system for systematically creating card-based hypermedia manuals as claimed in claim 10 wherein said platform dependent generator comprises:

receiving means for receiving said card-based manual in hypermedia card format; and processing means for providing a card-based manual in platform-dependent format.

13. A method for systematically creating card-based hypermedia manuals comprising the steps of:

transforming SGML documents and AIU files into card-based SGML documents;

editing card style into card layout style specifications, wherein editing card style comprises the step of generating card layout style specifications for formatting card-based SGML documents; and formatting said card-based SGML documents with said card layout style specifications to provide said card-based hypermedia manuals.

14. A method for systematically creating card-based hypermedia manuals as claimed in claim 13 further comprising the step of:

extracting a media-card from non-textual media.

15. A method for systematically creating card-based hypermedia manuals as claimed in claim 13 wherein formatting comprises the steps of:

receiving card-based SGML documents;

receiving card layout style specifications;

generating a card-based manual in hypermedia card format;

receiving a presentation model; and generating a card-based manual in platform-dependent format.

16. Style specifications for systematically creating card-based hypermedia manuals comprising:

a media-card extractor for receiving non-textual media;

a presentation formatter connected to said media-card extractor; and a card style editor connected to said presentation formatter, wherein the card style editor comprises a generator for generating card layout style specifications for formatting card-based SGML documents.

* * * * *